(12) United States Patent
Guezelarslan et al.

(10) Patent No.: US 11,153,017 B2
(45) Date of Patent: Oct. 19, 2021

(54) TEST SYSTEM AND METHOD FOR TESTING A DEVICE UNDER TEST

(71) Applicant: Rohde & Schwarz GmbH & Co. KG, Munich (DE)

(72) Inventors: Baris Guezelarslan, Munich (DE); Dominik Hettich, Munich (DE); Magdalena Poellmann, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 16/703,680

(22) Filed: Dec. 4, 2019

(65) Prior Publication Data

US 2021/0175981 A1 Jun. 10, 2021

(51) Int. Cl.
*H04B 17/00* (2015.01)
*G08C 23/02* (2006.01)
*H04B 17/16* (2015.01)

(52) U.S. Cl.
CPC ......... *H04B 17/0085* (2013.01); *G08C 23/02* (2013.01); *H04B 17/16* (2015.01)

(58) Field of Classification Search
CPC ..... H04B 17/0085; H04B 17/16; G08C 23/02
See application file for complete search history.

(56) References Cited

U.S. PATENT DOCUMENTS

| 2007/0159199 | A1 | 7/2007 | Talwar et al. |
| 2009/0257600 | A1* | 10/2009 | Dorfman ............. H04R 29/004 381/58 |
| 2017/0078031 | A1 | 3/2017 | Olgaard et al. |
| 2020/0341044 | A1* | 10/2020 | Kvarnstrand ...... G01R 29/0871 |

FOREIGN PATENT DOCUMENTS

| EP | 1755242 A2 | 2/2007 |
| EP | 2392932 A1 | 12/2011 |
| EP | 2812846 B1 | 12/2014 |
| WO | 2005/055566 A1 | 6/2005 |

* cited by examiner

*Primary Examiner* — Curtis B Odom
(74) *Attorney, Agent, or Firm* — Christensen O'Connor Johnson Kindness PLLC

(57) ABSTRACT

A test system comprises a device under test and a testing device. The device under test comprises a first microphone, wherein the first microphone is configured to receive sound waves. The testing device comprises a first speaker, wherein the first speaker is configured to generate sound waves. The testing device is configured to generate a first acoustic command signal via the first speaker, wherein the first acoustic command comprises a first test command. The device under test is configured to receive the first acoustic command signal via the first microphone. The device under test is configured to generate a first electromagnetic test signal based on the first test command.

16 Claims, 1 Drawing Sheet

TEST SYSTEM AND METHOD FOR TESTING A DEVICE UNDER TEST

FIELD OF THE DISCLOSURE

Embodiments of the present disclosure generally relate to a test system. Embodiments of the present disclosure further relate to a method for testing a device under test via a testing device.

BACKGROUND

In the state of the art, different types of measurement systems for testing a radio frequency (RF) communication device under test with regard to its over-the-air (OTA) properties are known. Such measurement systems are used to test certain properties of the device under test, for example certain properties of signals generated by the device under test.

In order to test the device under test, the device under test must be controlled to enter a certain operational mode that is to be tested. For example, the device under test needs to be controlled to enter a sending mode and/or a receiving mode. For this purpose, it is known to connect the device under test to a control device via a cable that is plugged into the device under test.

However, as the device under test needs to be connected to a cable, the measurement process takes more time. Moreover, the cable leading to the device under test may alter the electromagnetic properties of the environment of the device under test such that the measurement results are distorted.

Accordingly, there is a need for a test system as well as a method for testing a device under test that allow for an undisturbed testing of the device under test.

SUMMARY

Embodiments of the present disclosure provide a test system. In an embodiment, the test system comprises a device under test and a testing device. The device under test comprises, in an embodiment, a first microphone, wherein the first microphone is configured to receive sound waves, and a first speaker, wherein the first speaker is configured to generate sound waves. The testing device is configured to generate a first acoustic command signal via the first speaker, wherein the first acoustic command comprises a first test command. The device under test is configured to receive the first acoustic command signal via the first microphone. In an embodiment, the device under test is configured to generate a first electromagnetic test signal based on the first test command.

The device under test may be a mobile communication device for 2G, 3G, 4G, 5G, for instance 5GNR, and/or LTE, for example a smart phone, a laptop, a tablet, a WLAN router, an internet of things (IoT) device or any other kind of smart device having a communication interface.

The test system according to the disclosure is based on the idea to transmit the first test command from the testing device to the device under test wirelessly, i.e. without a cable leading from the testing device to the device under test. Thus, the electromagnetic properties of the environment of the device under test and/or the ones of the device under test itself are not changed by plugging a cable into the device under test. Moreover, no disturbing objects like the cable are located within a testing chamber used for testing the device under test, for example a shielded chamber, also called anechoic chamber.

Moreover, no additional electromagnetic disturbances are caused by the wireless transmission of the first test command, because the first test command is transmitted via the first acoustic command signal, i.e. via sound waves.

The sound waves may have a frequency in the audible and/or non-audible frequency range, for example in the ultrasound frequency range. Accordingly, electromagnetic perturbations caused by a movement of a magnet in the first speaker have a frequency being essentially equal to the frequency of the audible or non-audible sound waves. Accordingly, the electromagnetic perturbations may have a frequency that is smaller than 1 MHz.

Thus, the frequency of the electromagnetic perturbations is much smaller than a communication frequency of the device under test, which is typically in the range of 100 MHz to about 200 GHz. Accordingly, testing of the device under test is not impaired by the first acoustic command signal itself and/or by the generation of the first acoustic command signal.

The device under test may be provided with suitable software such that the device under test can process and "understand" the first test command that is transmitted via the sound waves from the testing device to the device under test.

According to an aspect of the present disclosure, the testing device comprises an antenna being configured to receive the first electromagnetic test signal. Thus, the first electromagnetic test signal can be received and may be analyzed by the testing device in order to test and/or analyze certain properties of the device under test.

According to another aspect of the present disclosure, the testing device comprises an analysis module, wherein the analysis module is configured to analyze the first electromagnetic test signal. The analysis module tests certain properties of the device under test by analyzing the first electromagnetic test signal. For example, the testing device may test certain communication layers of the first electromagnetic signal and/or the device under test.

In an embodiment of the present disclosure, the testing device is configured to simulate a RF communication partner of the device under test. In other words, the second electromagnetic test signal is generated with defined properties such that a certain communication partner for the device under test is simulated by the testing device. For example, the testing device may simulate a mobile communication base station, another mobile communication device, a router, or any other type of RF communication device that is associated with an actual use case of the device under test.

In a further embodiment of the present disclosure, the device under test comprises a second speaker being configured to generate sound waves, wherein the testing device comprises a second microphone being configured to receive sound waves. Accordingly, commands and/or requests can also be transmitted from the device under test to the testing device via sound waves, such that electromagnetic measurements are not impaired.

According to another aspect of the present disclosure, the device under test is configured to generate a second acoustic signal via the second speaker. The second acoustic signal comprises a second test command. The device under test is configured to receive the second acoustic signal via the second microphone. The device under test is configured to generate a second electromagnetic test signal based on the second test command. The second acoustic signal or rather the second test command may comprise a command for the testing device to enter a certain operational mode, e.g. a RF sending mode and/or a RF receiving mode. Therein, the second test command is transmitted from the device under test to the testing device via sound waves, such that electromagnetic measurements are not impaired.

The device under test may comprise an antenna being configured to receive the second electromagnetic test signal. Thus, the second electromagnetic test signal can be received and may be analyzed by the device under test in order to test and/or analyze certain properties of the device under test.

Accordingly, a bi-directional communication via sound waves and/or via electromagnetic waves may be established between the device under test and the testing device.

According to another aspect of the present disclosure, the testing device comprises a housing, wherein the housing defines a shielded space, and wherein the device under test is placed in the shielded space. The housing is made of metal or another suitable material, such that the housing prevents electromagnetic waves from the outside from propagating into the shielded space. Accordingly, the shielded space is free of external electromagnetic waves, such that tests can be performed on the device under test without external electromagnetic perturbations.

Generally, the shielded space may relate to a shielded chamber or rather a shielded box. Typically, the shielded chamber is also called anechoic chamber.

The housing may comprise opening and closing means via which the housing can be opened and closed. In an open state of the housing, the device under test can be inserted into the housing and/or it can be taken out of the housing. For testing purposes, the housing is closed via the opening and closing means.

In an embodiment of the present disclosure, the first speaker is located in the shielded space. Accordingly, the first acoustic command signal is generated within the shielded space.

If the testing device comprises a microphone, the microphone may also be located in the shielded space.

In some embodiments, the housing comprises a shielded connector extending from the shielded space to an exterior of the housing, wherein the shielded connector is connected to the first speaker. The first speaker may be contacted via a cable from the outside that is plugged into the shielded connector. This way, the first speaker can be contacted from outside of the housing, wherein electromagnetic perturbations are prevented from propagating into the shielded chamber by the shielded connector. Moreover, no cables are located within the shielded space that may have different positions and/or orientations during different tests.

Thus, a comparable shielded space can be ensured for different tests. Hence, benchmarking tests can be guaranteed, as the testing environment is always the same.

If the testing device comprises a microphone, the housing may comprise a second shielded connector or the shielded connector may be a common connector for both the first speaker and the second microphone According to an aspect of the present disclosure, the test system comprises at least a second device under test. The second device under test comprises a microphone. The microphone of the second device under test is configured to receive sound waves. The second device under test is configured to receive the first acoustic command signal via the microphone of the second device under test. The second device under test is configured to generate an electromagnetic test signal based on the first test command. Thus, the test system may be used to simultaneously test several (i.e. at least two) devices under test. This way, an overall testing time per device under test is reduced.

According to another aspect of the present disclosure, the testing device is configured to simulate a respective RF communication partner for each one of the devices under test. In other words, the second electromagnetic test signal is generated with defined properties such that a certain communication partner for each one of the devices under test is simulated by the testing device. Therein, the same electromagnetic test signal may be used for all devices under test. Alternatively, a distinct electromagnetic signal may be generated for at least two devices under test, in particular for all devices under test.

Embodiments of the present disclosure further provide a test system comprising a device under test and a testing device. The device under test comprises a first speaker, wherein the first speaker is configured to generate sound waves. The testing device comprises a first microphone, wherein the first microphone is configured to receive sound waves. The device under test is configured to generate a first acoustic command signal via the first speaker, wherein the first acoustic command signal comprises a first test command. The testing device is configured to receive the first acoustic command signal via the first microphone. The testing device is configured to generate a first electromagnetic test signal based on the first test command.

The test system according to the disclosure is based on the idea to transmit the first test command from the device under test to the testing device wirelessly, i.e. without a cable leading from the testing device to the device under test. Thus, the electromagnetic properties of the environment of the device under test and/or of the device under test itself are not changed by plugging a cable into the device under test.

Moreover, no additional electromagnetic disturbances are caused by the wireless transmission of the first test command, because the first test command is transmitted via the first acoustic command signal, i.e. via sound waves.

The sound waves may have a frequency in the audible and/or non-audible frequency range, for example in the ultrasound frequency range. Accordingly, electromagnetic perturbations caused by e.g. a movement of magnets in the first speaker have a frequency being essentially equal to the frequency of the audible or non-audible sound waves. Accordingly, the electromagnetic perturbations have a frequency that is smaller than 1 MHz.

Thus, the frequency of the electromagnetic perturbations is much smaller than a communication frequency of the device under test, which is typically in the range of 100 MHz to about 200 GHz. Accordingly, testing of the device under test is not impaired by the first acoustic command signal itself and/or by the generation of the first acoustic command signal.

The testing device may be provided with suitable software such that the testing device can process and "understand" the first test command that is transmitted via sound waves from the device under test to the testing device.

Regarding the remaining advantages and properties of the second embodiment of the test system, reference is made to the explanations given above with respect to the first embodiment of the test system, which also apply to the second embodiment and vice versa.

Embodiments of the present disclosure further provide a test method for testing a device under test via a testing device, comprising the following steps:

generating a first acoustic command signal via a first speaker of the testing device, the first acoustic command signal comprising a first test command;

receiving the first acoustic command signal via a first microphone of the device under test; and generating a first electromagnetic test signal based on the first test command.

Regarding the advantages and properties of the method for testing a device under test, reference is made to the explanations given above with respect to the embodiments of the test system, which also apply to the method and vice versa.

According to an aspect of the present disclosure, the first electromagnetic test signal is received and analyzed by the testing device. The testing device tests certain properties of the device under test by analyzing the first electromagnetic test signal. For example, the testing device may test certain communication layers of the first electromagnetic signal and/or the device under test.

According to another aspect of the present disclosure, the method comprises the following additional steps:

generating a second acoustic command signal via a second speaker of the device under test, wherein the second acoustic command signal comprises a second test command;

receiving the second acoustic command signal via a second microphone of the testing device, wherein the second acoustic command signal comprises a second test command; and generating a second electromagnetic test signal based on the first test command.

Accordingly, commands and/or requests can also be transmitted from the device under test to the testing device via sound waves, such that electromagnetic measurements are not impaired.

In an embodiment of the present disclosure, the device under test is placed in a shielded space defined by a housing of the testing device. The housing is made of metal or another suitable material, such that the housing prevents electromagnetic waves from the outside from propagating into the shielded space. Accordingly, the shielded space is free of external electromagnetic waves, such that tests can be performed on the device under test without external electromagnetic perturbations.

In a further embodiment of the present disclosure, a RF communication partner of the device under test is simulated via the testing device. In other words, the second electromagnetic test signal is generated with defined properties such that a certain communication partner for the device under test is simulated by the testing device. For example, the testing device may simulate a mobile communication base station, another mobile communication device, a router, or any other type of RF communication device that is associated with an actual use case of the device under test.

In some embodiments at least a second device under test is provided. In some embodiments, several additional devices under test may be provided. Thus, several (i.e. at least two) devices under test may be simultaneously tested. This way, an overall testing time per device under test is reduced.

According to another aspect of the present disclosure, a respective RF communication partner for each one of the devices under test is simulated via the same testing device. In other words, the second electromagnetic test signal is generated with defined properties such that a certain communication partner for each one of the devices under test is simulated. Therein, the same electromagnetic test signal may be used for all devices under test. Alternatively, a distinct electromagnetic signal may be generated for at least two devices under test, in particular for all devices under test.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
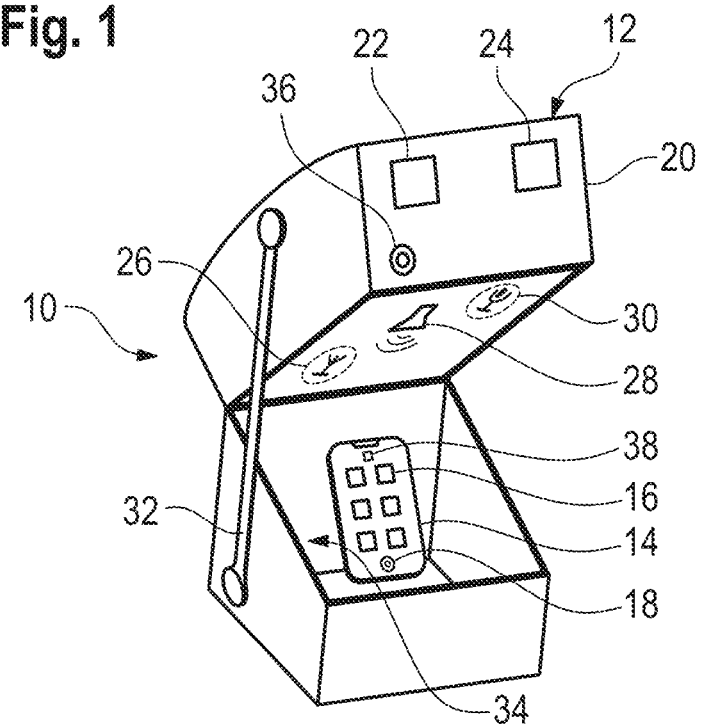
FIG. 1 schematically shows a test system according to a first embodiment of the disclosure.

FIG. 1 schematically shows a test system 10 comprising a testing device 12 and a device under test 14. Generally speaking, the device under test 14 is a user equipment device that is configured to wirelessly communicate with other devices via electromagnetic waves, for example in a radio frequency range.

The device under test 14 comprises an antenna 16 for receiving and transmitting electromagnetic waves. The device under test 14 further comprises a first microphone 18 that is configured to receive sound waves in an audible and/or non-audible frequency range, for example ultrasound.

For example, the device under test 14 in some embodiments is a mobile communication device for 2G, 3G, 4G, 5G and/or LTE, for example a smart phone, a laptop, a tablet, a WLAN router, an internet of things (IoT) device or any other kind of smart device.

The testing device 12 comprises a housing 20, a control circuit(s) or module 22, an analysis circuit(s) or module 24, at least one antenna 26, a first speaker 28, and a second microphone 30. In some embodiments, the testing device 12 may comprise several antennas 26.

Therein and in the following, the term "module" is understood to denote components comprising suitable hardware and/or software, for example a suitable combination of hardware and software.

The housing 20 comprises opening and closing means 32 via which the housing 20 can be opened and closed. In an open state of the housing 20, the device under test 14 can be inserted into the housing 20 and/or can be taken out of the housing 20. In a closed state of the housing 20, the housing 20 defines a shielded space 34 on the inside of the housing 20.

The housing 20 is made of metal or another suitable material, such that the housing 20 prevents electromagnetic waves from the outside from propagating into the shielded space 34. Accordingly, the shielded space 34 is free of external electromagnetic waves if the housing 20 is in the closed state, such that tests can be performed on the device under test 14 without external electromagnetic perturbations.

The housing 20 further comprises a shielded connector 36 that extends from an exterior side of the housing 20 through the housing 20 into the shielded space 34.

The first speaker 28 of the testing device 12 is mounted to the housing 20 within the shielded space 34 and is connected to the shielded connector 36. The antenna 26 of the testing device 12, the first speaker 28 and the second microphone 30 are each connected to the analysis module 24 in a signal transmitting manner. Moreover, the antenna 26 of the testing device 12, the first speaker 28 and the second microphone 30 may each be connected to the control module 22 in a signal transmitting manner. The control module 22 is configured to control the antenna 26 of the testing device 12, the first speaker 28 and/or the second microphone 30, as will be described in more detail below.

Figure 2:
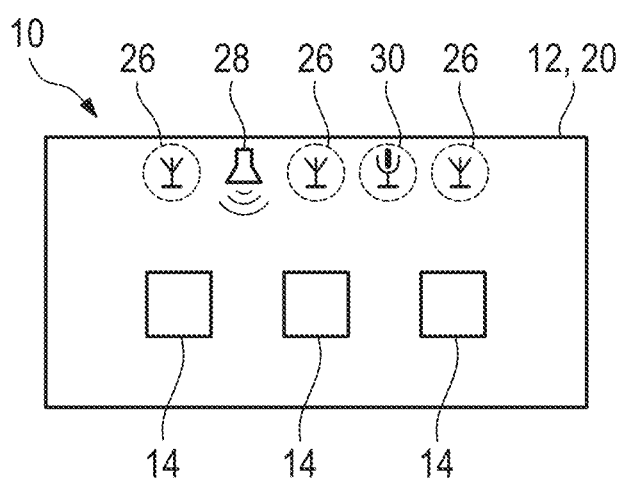
FIG. 2 schematically shows a test system according to a second embodiment of the disclosure.

FIG. 2 schematically shows another embodiment of the test system 10. In the following, only the differences with respect to the embodiment of FIG. 1 will be described, wherein the same reference numerals are used for components with the same functionality.

The test system 10 comprises several (i.e. at least two) devices under test 14 that are placed in the shielded space 34. In other words, the housing 20 of the testing device 12 defines a common shielded space 34 for the several devices under test 14. Therein, the devices under test 14 may be identically constructed. Alternatively, at least two of the devices under test 14 may be established as different devices. In some embodiments, one or several antennas 26 of the testing device 12 may be associated with each one of the devices under test 14.

The explanations given in the following apply to both embodiments of the test system 10 described above.

Figure 3:
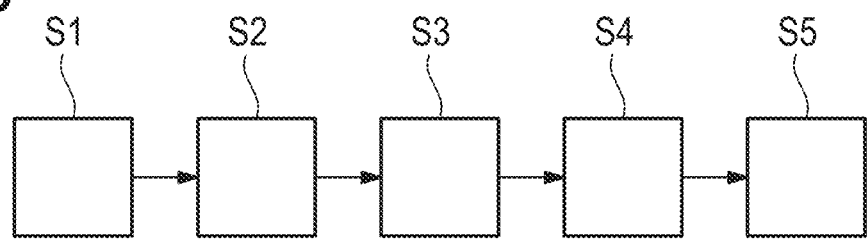
FIG. 3 shows a flow chart of a representative method for testing a device under test according to an embodiment of the disclosure.

The test system 10 is configured to perform a test method for testing the device under test 14 or the devices under test 14 described in the following with reference to FIG. 3. In the following, the method will be described with respect to the embodiment of the test system 10 of FIG. 1. However, it is to be understood that these explanations also apply to the embodiment of the test system 10 shown in FIG. 2.

The testing device 12 generates a first acoustic command signal via the first speaker 28 (step S1). More precisely, the control module 22 controls the first speaker 28 to generate the first acoustic command signal.

Alternatively or additionally, the first speaker 28 may be controlled by an external control device via a cable that is plugged into the shielded connector 36. In this case, the external control device may control the first speaker 28 to generate the first acoustic command signal.

The first acoustic command signal comprises a first test command. The first test command contains instructions for the device under test 14 to enter a certain operational mode, e.g. a sending mode and/or a receiving mode.

The first acoustic command signal is received by the device under test 14 via the first microphone 18 (step S2). The first acoustic command signal is processed by the device under test 14 and an operational mode of the device under test 14 is adapted based on the first acoustic command signal, more precisely based on the first test command.

The device under test 14 may be provided with suitable software such that the device under test 14 can process and "understand" the first test command that is transmitted via sound waves from the testing device 12 to the device under test 14.

Accordingly, the first test command is transmitted from the testing device 12 to the device under test 14 via sound waves, such that no electromagnetic perturbations are generated in the shielded space when the first test command is transmitted to the device under test 14.

The device under test 14 generates a first electromagnetic test signal based on the first acoustic command signal or rather based on the first test command (step S3). The testing device 12 receives the test signal via the antenna 26, wherein the received test signal is forwarded to the analysis module 24 for further analysis (step S4).

The analysis module 24 analyzes the received test signal in order to test certain properties of the device under test 14. The testing device 12 may generate a second electromagnetic test signal based on the analysis of the first test signal (step S5).

Therein, the testing device 12 may simulate a communication partner for the device under test 14. In other words, the second electromagnetic test signal is generated with defined properties such that a certain communication partner for the device under test 14 is simulated by the testing device 12.

For example, the testing device 12 may simulate a mobile communication base station, another mobile communication device, a router, or any other type of RF communication device that is associated with an actual use case of the device under test 14.

The device under test 14 receives the second electromagnetic test signal via the antenna 16 of the device under test 14. Further, the device under test 14 may generate another electromagnetic signal, which is received by the testing device 12. In other words, a RF communication is established between the device under test 14 and the testing device 12.

It is noted that, in the embodiment of the test system 10 shown in FIG. 2, the testing device 12 may simulate a respective RF communication partner for each one of the several devices under test 14.

Alternatively or additionally to the steps described above, the following steps may be performed by the test system 10.

The device under test 14 may comprise a second speaker 38 and may generate a second acoustic signal via the second speaker 38. The second acoustic signal comprises a second test command containing instructions for the testing device 12 to enter a certain operational mode, e.g. a receiving mode and/or a sending mode. The second acoustic signal is received by the testing device 12 via the second microphone 30 and is forwarded to the analysis module 24. The analysis module 24 analyzes the second acoustic signal or rather the second test command. The control module 22 controls the antenna 26 of the testing device 12 to generate an electromagnetic test signal.

Similarly to the method described above, the testing device 12 may simulate a RF communication partner for the device under test 14, such that a RF communication is established between the device under test 14 and the testing device 12.

Certain embodiments disclosed herein utilize circuitry (e.g., one or more circuits) in order to implement protocols, methodologies or technologies disclosed herein, operably couple two or more components, generate information, process information, encode signals, decode signals, transmit and/or receive signals, etc. Circuitry of any type can be used. For example, as described above, the control module 22, the analysis module 24, or other components of the testing device 12 or device under test 14 may include, in some embodiments, logic for implementing the technologies and methodologies described herein. This logic of these components can be carried out in circuitry that includes hardware or a combination of hardware and software. In some embodiments, logic of these components is carried out in software.

In an embodiment, circuitry includes, among other things, one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, circuitry includes one or more ASICs having a plurality of predefined logic components. In an embodiment, circuitry includes one or more FPGA having a plurality of programmable logic components. In an embodiment, circuitry includes hardware circuit implementations (e.g., implementations in analog circuitry, implementations in digital circuitry, and the like, and combinations thereof).

In an embodiment, circuitry includes combinations of circuits and computer program products having software or firmware instructions stored on one or more computer readable memories that work together to cause a device to perform one or more protocols, methodologies or technologies described herein. In an embodiment, circuitry includes circuits, such as, for example, microprocessors or portions of microprocessor, that require software, firmware, and the like for operation. In an embodiment, circuitry includes an implementation comprising one or more processors or portions thereof and accompanying software, firmware, hardware, and the like.

In an embodiment, circuitry includes a baseband integrated circuit or applications processor integrated circuit or a similar integrated circuit in a server, a broadcast/streaming device, such as for example a cellular network device, an OTA network device, an OTT network device, a satellite network device, an internet protocol device, etc., and other network devices, or other computing devices. In an embodiment, circuitry includes one or more remotely located components. In an embodiment, remotely located components are operably coupled via wireless communication. In an embodiment, remotely located components are operably coupled via one or more receivers, transmitters, transceivers, or the like.

In an embodiment, circuitry includes one or more memory devices that, for example, store instructions or data. Non-limiting examples of one or more memory devices include volatile memory (e.g., Random Access Memory (RAM), non-volatile memory (e.g., Read-Only Memory (ROM), or the like. The one or more memory devices can be coupled to, for example, one or more computing devices by one or more instructions, data, or power buses. In an embodiment, circuitry may also include a computer-readable media drive or memory slot configured to accept signal-bearing medium (e.g., computer-readable memory media, computer-readable recording media, or the like). In an embodiment, a program for causing a system or device to execute any of the disclosed methods can be stored on, for example, a computer-readable recording medium (CRMM), a signal-bearing medium, or the like.

The present application may reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A test system comprising:
   a device under test and a testing device,
   said device under test comprising a first microphone, wherein said first microphone is configured to receive sound waves,
   said testing device comprising a first speaker, wherein said first speaker is configured to generate sound waves,
   said testing device being configured to generate a first acoustic command signal via said first speaker, said first acoustic command comprising a first test command,
   said device under test being configured to receive said first acoustic command signal via said first microphone, and
   said device under test being configured to generate a first electromagnetic test signal based on said first test command,
   wherein said testing device comprises a housing, wherein the housing defines an electromagnetically shielded space, and wherein said device under test is placed in the electromagnetically shielded space,
   wherein said first speaker is located in the electromagnetically shielded space, and
   wherein the housing comprises an electromagnetically shielded connector extending from the electromagnetically shielded space to an exterior of the housing, wherein said shielded connector is connected to said first speaker.

2. The test system of claim 1, wherein the testing device comprises an antenna being configured to receive the first electromagnetic test signal.

3. The test system of claim 2, wherein the testing device comprises an analysis module, wherein the analysis module is configured to analyze said first electromagnetic test signal.

4. The test system of claim 1, wherein the testing device is configured to simulate a RF communication partner of the device under test.

5. The test system of claim 1, wherein said device under test comprises a second speaker being configured to generate sound waves, and wherein said testing device comprises a second microphone being configured to receive sound waves.

6. The test system of claim 5, wherein said device under test is configured to generate a second acoustic signal via said second speaker, said second acoustic signal comprising a second test command, said device under test being configured to receive said second acoustic signal via said second microphone, and said device under test being configured to generate a second electromagnetic test signal based on said second test command.

7. The test system of claim 6, wherein the device under test comprises an antenna being configured to receive the second electromagnetic test signal.

8. The test system of claim 1, comprising at least a second device under test, said second device under test comprising a microphone, wherein the microphone of the second device under test is configured to receive sound waves, wherein said second device under test is configured to receive said first acoustic command signal via said microphone of the second device under test, and wherein said second device under test is configured to generate an electromagnetic test signal based on said first test command.

9. The test system of claim 8, wherein said testing device is configured to simulate a respective RF communication partner for each one of the devices under test.

10. A test system comprising a device under test and a testing device,
said device under test comprising a first speaker, wherein said first speaker is configured to generate sound waves,
said testing device comprising a first microphone, wherein said first microphone is configured to receive sound waves,
said device under test being configured to generate a first acoustic command signal via said first speaker, said first acoustic command signal comprising a first test command,
said testing device being configured to receive said first acoustic command signal via said first microphone,
and said testing device being configured to generate a first electromagnetic test signal based on said first test command,
wherein said testing device comprises a housing, wherein the housing defines an electromagnetically shielded space, and wherein said device under test is placed in the electromagnetically shielded space,
wherein said first microphone is located in the electromagnetically shielded space, and
wherein the housing comprises a shielded connector extending from the electromagnetically shielded space to an exterior of the housing, wherein said shielded connector is connected to said first microphone.

11. A test method for testing a device under test via a testing device, comprising:
generating a first acoustic command signal via a first speaker of said testing device, said first acoustic command signal comprising a first test command;
receiving said first acoustic command signal via a first microphone of said device under test; and
generating a first electromagnetic test signal based on the first test command,
wherein the device under test is placed in an electromagnetically shielded space defined by a housing of the testing device,
wherein said first speaker is located in the electromagnetically shielded space, and
wherein the housing comprises a shielded connector extending from the electromagnetically shielded space to an exterior of the housing, wherein said shielded connector is connected to said first speaker.

12. The test method of claim 11, wherein said first electromagnetic test signal is received and analyzed by the testing device.

13. The method of claim 11, further comprising:
generating a second acoustic command signal via a second speaker of said device under test, said second acoustic command signal comprising a second test command;
receiving said second acoustic command signal via a second microphone of said testing device, said second acoustic command signal comprising a second test command; and
generating a second electromagnetic test signal based on the first test command.

14. The method of claim 11, wherein a RF communication partner of the device under test is simulated via said testing device.

15. The method of claim 11, wherein at least a second device under test is provided.

16. The method of claim 15, wherein a respective RF communication partner for each one of the devices under test is simulated via the same testing device.

* * * * *